United States Patent [19]

Redman

[11] Patent Number: 4,777,207
[45] Date of Patent: Oct. 11, 1988

[54] AQUEOUS DISPERSION OF FILM FORMING POLYMER AND PROCESS OF PREPARING SAME

[75] Inventor: Richard P. Redman, Reading, England

[73] Assignee: Imperial Chemical Industries plc, London, England

[21] Appl. No.: 635,596

[22] Filed: Jul. 30, 1984

[30] Foreign Application Priority Data

Aug. 15, 1983 [GB] United Kingdom ............... 8321933

[51] Int. Cl.$^4$ ............................................... C08F 2/16
[52] U.S. Cl. ..................................... 524/458; 524/457
[58] Field of Search ................................ 524/458, 457

[56] References Cited

U.S. PATENT DOCUMENTS 4,066,586 1/1978 Tanuma et al. ..................... 525/438
4,285,847 8/1981 Ting ..................................... 526/271
4,373,054 2/1983 Gibson et al. ....................... 524/460

Primary Examiner—Joseph L. Schofer
Assistant Examiner—J. M. Reddick
Attorney, Agent, or Firm—Cushman, Darby & Cushman

[57] ABSTRACT

Aqueous dispersions of film-forming polymer particles are prepared by first forming a cationically or anionically stabilized dispersion in water of a solution of preformed polymer or polymer plasticizer in initial polymerizable monomer; then polymerizing the monomer and forming disperse polymer particles; and thereafter adding further polymerizable monomer which is then polymerized. The Tg of polymer prepared from the further monomer is higher than that of polymer prepared from the initial monomer. The polymer dispersions are useful in providing thick electrodeposited coatings.

6 Claims, No Drawings

AQUEOUS DISPERSION OF FILM FORMING POLYMER AND PROCESS OF PREPARING SAME

This invention relates to coating compositions, more particularly to aqueous dispersions of film-forming polymer particles which are useful in a process of coating articles by electrodeposition.

European patent application No. 55270 discloses a process of preparing an aqueous cationically stabilised dispersion of particles of film-forming polymer which consists in, inter alia, preparing a stable cationically stabilised dispersion in water of preformed polymer or polymer plasticiser which is dissolved in polymerisable ethylenically unsaturated monomer; and thereafter polymerising the unsaturated monomer to form a particulate dispersion of film-forming polymer particles which comprise a blend of preformed polymer or polymer plasticiser and polymer formed in situ from the unsaturated monomer. Dispersions of this type which are suitable for use in a cathodic electrodeposition process are selected by a defined test procedure.

One advantage of the dispersion of polymer particles described in EP No. 55270 is that it may be electrodeposited onto a conductive substrate as a relatively thick coating. We have now found that by modifying the process of EP No. 55270 for a given total monomer composition, there may be produced a dispersion which yields an even thicker coating by electrodeposition. We believe that the modification in the process modifies the coalescence behaviour of the dispersed particles as they are electrodeposited at an electrode, although we are in no way bound by this belief. According to this invention we provide a process of preparing an aqueous dispersion of film-forming polymer particles which comprises the steps:

(a) forming a stable cationically or anionically stabilised dispersion in aqueous medium of a preformed polymer or polymer plasticiser which is dissolved in polymerisable ethylenically unsaturated monomer, (b) causing polymerisation of the ethylenically unsaturated monomer and forming disperse particles of film-forming polymer, the particles comprising a blend of preformed polymer or polymer plasticiser and of polymer formed in situ from unsaturated monomer, (c) thereafter adding to the dispersion of polymer particles formed in (b) further polymerisable ethylenically unsaturated monomer, which if polymerised alone would yield polymer of Tg higher than that of the polymer formed in situ in (b), and (d) causing polymerisation of this further monomer to produce a dispersion of film-forming particles which are a modification of the particles produced in (b).

According to a further feature of the invention we provide a dispersion of film-forming polymer particles which has been prepared by the process described above.

According to another feature of the invention we provide a method of coating a conductive substrate as one electrode by passing an electric current between that electrode and a counter-electrode, the substrate being immersed in an aqueous dispersion of film-forming polymer particles as defined above.

The stability of the dispersion of preformed polymer or polymer plasticiser dissolved in unsaturated monomer and of the subsequently formed film-forming polymer particles may be due, at least in part, to the presence of a distinct cationic or anionic surfactant, for example a fatty amine salt and an alkyl aryl sulphonate. Alternatively, and preferably, the stability of the dispersion is due, at least in part, to the presence of stabilising groups in the preformed polymer or polymer plasticiser or in monomer which is to be formed into polymer in situ. Thus in the latter case the preformed polymer or polymer plasticiser and/or monomer, behave also as a surfactant.

The preformed polymer or polymer plasticiser and the polymer formed in situ respectively may contain mutually reactive groups which enable crosslinking, for example hydroxyl and isocyanate groups respectively. Alternatively there may be present additionally a crosslinking agent which comprises reactive groups complementary to those just mentioned. Preferably the crosslinking agent is dissolved in the polymerisable monomer in step (a). Preferably the crosslinking agent is reactive with hydroxyl groups present in a preformed polymer and in the polymer formed in situ. Particularly preferred types of dispersion are the cationically and anionically stabilised three-component dispersions which are described in our United Kingdom patent specification No. 2,102,436 and the disclosure of that specification is incorporated herein by reference. In that specification the polymeric modifier corresponds to the preformed polymer in the present specification. Suitable preformed polymers include the hydroxyl group-containing epoxy resins, for example those derived from epichlorhydrin and diphenylolpropane, alkyd resins and polyesters. The molecular weight of the preformed polymer should be at least 700. Stabilising groups may be introduced into a preformed polymer by a suitable chemical reaction for example by adduction of epoxide groups in an epoxy resin with an amine and a phenol.

A wide range of polymerisable ethylenically unsaturated monomers may be employed in the process. Typical monomers which are found useful in step (c) of the process include for example methyl methacrylate and styrene when typical monomers which are employed in step (a) include for example hydroxy ethyl methacrylate, butyl methacrylate, ethyl acrylate, butyl acrylate and 2-ethylhexyl acrylate. The "hard" monomer used in step (c) may of course be present also as a comonomer in the preparation of the in situ polymer in step (b). In general it is preferred to add in step (c), for a given total formulation of monomer which is desired in an overall polymer composition, from 1 to 50% by weight of a "hard" monomer, e.g. methyl methacrylate, which would otherwise have been added at stage (a) of the process. The Tg of a given polymer may be available in a chemical reference book. Alternatively it may be calculated or determined experimentally.

Preferably the monomer added at stage (c) is stirred into the dispersion for a period at least up to 1 hour in order that it has the maximum effect in modifying the particles formed in (b).

The initiation of polymerisation of unsaturated monomer in (b) and (d) may be caused by conventional techniques, for example using free radical initiation either thermally induced or by a redox couple.

By an aqueous medium we mean a medium which comprises at least 50% by weight of water and preferably at least 90% by weight of water. Water-miscible liquids which may be present in the aqueous medium include alcohols. However, it is necessary that the monomers employed have a low solubility in the aqueous medium, and preferably the total monomers have a maximum solubility in water of 10% at 25° C.

The aqueous dispersions produced in the present process may also be combined with any of the additives used in formulating coating compositions, for example pigment. They may be applied to a substrate, for example, by anodic or cathodic deposition, but they may also be applied by other conventional procedures.

The invention is illustrated by the following Example in which parts and percentages are by weight.

EXAMPLE

Five dispersions of film-forming polymer particles (which also contained a consistent proportion of a crosslinking agent) were prepared using the formulations 1-5 given in the accompanying Table. The total formulations were identical in polymerisable monomer content but in formulations 2-5 there was an increasing proportion of "hard" monomer (i.e. monomer which if polymerised alone would give polymer of higher Tg than that given by the initial mixture of methyl methacrylate and hydroxyethyl methacrylate)added in the secondary stage of polymerisation.

The 1st charge A. components were mixed together and emulsified in the water using a high shear emulsifier. The 1st charge B. components were then added, the temperature raised to 30° C. and polymerisation allowed to proceed over 16 hours.

The 2nd charge C. components were then stirred over about 10 minutes until no monomer was visible on the surface. The 2nd charge D. components were then added and the temperature maintained at 30°-40° C. for 8 hours.

500 parts of each of the resulting dispersions were converted to a paint by mixing with water (480 parts) and then adding a grey millbase (20 parts). The millbase had been prepared from water (28.8 parts), titanium dioxide (45.9 parts), the black pigment "Printex" 140V (0.8 part) and a pigment dispersant (24.4 parts). The pigment dispersant had been prepared by dissolving "Epikote" 1001 (38.8 parts) in butyl "Cellosolve" (47.6 parts). Diethanolamine (3.8 parts) and benzylamine (1.9 parts) were added and the mixture heated at 125° C. for 4 hours. After cooling, lactic acid (80%, 7.9 parts) was added, ("Printex", "Epikote" and "Cellosolve" are Registered Trade Marks).

The five paints were each deposited as a coating on phosphated steel panels as cathodes at 25° C. and 200 volts for 120 seconds (and other conditions being constant). They were rinsed, dried at 80° C. for 1 hour and stoved at 190° C. for 20 minutes. The film thickness of each coating obtained from paints which were based on formulations 1-5 was as follows:

| 1 | 2 | 3 | 4 | 5 |
|---|---|---|---|---|
| 30µ | 33µ | 55µ | 68µ | 110µ |

Table Note (a)

The preformed polymer used in this Example is an epoxy resin prepared from epichlorhydrin and Bisphenol A and commercially available as "Epikote" 1007 ("Epikote" is a Registsred Trade Mark). This resin was at least partially modified to have surfactant properties by adduction with diethanolamine as follows. "Epikote" 1007 (47.5 parts) was dissolved in methyl methacrylate (31.1 parts) containing p-methoxyphenol (0.025 part). Diethanolamine (2.2 parts) was added and the mixture heated at 90° C. for 4 hours. Hydroxyethyl methacrylate (18.7 parts) was then added.

Table Note (b)

The cross-linking agent was prepared by reacting citric acid (180 parts) with "Cardura" E (880 parts); "Cardura" E is the glycidyl ester of "Versatic" acid. ("Cardura" and "Versatic" are Registered Trade Marks).

TABLE

| | FORMULATION REFERENCE No. | | | | |
|---|---|---|---|---|---|
| | 1 | 2 | 3 | 4 | 5 |
| 1st Charge (parts) | | | | | |
| A. Preformed polymer adduct/monomer (see Note (a).) | 80 | 80 | 80 | 80 | 80 |
| Methyl methacrylate | 20 | 15 | 10 | 5 | 0 |
| Cross-linking agent (see Note (b).) | 25 | 25 | 25 | 25 | 25 |
| t-butyl perbenzoate | 3 | 2.7 | 2.5 | 2.3 | 2 |
| n-octyl mercaptan | 1 | 1 | 1 | 1 | 1 |
| lactic acid | 1.5 | 1.5 | 1.5 | 1.5 | 1.5 |
| amphipathic quaternary surfactant | 2 | 2 | 2 | 2 | 2 |
| dibutyl tin diacetate | 1 | 1 | 1 | 1 | 1 |
| water | 250 | 250 | 250 | 250 | 250 |
| b. ascorbic acid | 0.5 | 0.45 | 0.4 | 0.4 | 0.35 |
| ferrous sulphate | 0.25 | 0.23 | 0.2 | 0.2 | 0.2 |
| water | 40 | 36 | 33 | 33 | 24 |
| 2nd Charge (parts) | | | | | |
| C. Methyl methacrylate | 0 | 5 | 10 | 15 | 20 |
| t-butyl benzoate | 0 | 0.3 | 0.5 | 0.8 | 1 |
| D. ascorbic acid | 0 | 0.05 | 0.1 | 0.1 | 0.15 |
| ferrous sulphate | 0 | 0.02 | 0.05 | 0.05 | 0.05 |
| water | 0 | 4 | 7 | 7 | 16 |

I claim:

1. A process of preparing an aqueous dispersion of film-forming polymer particles which comprises the steps of:
   (a) forming a stable cationically stabilised dispersion in aqueous medium of a preformed polymer which has a molecular weight of at least 700 and which is selected from the group consisting of hydroxyl group-containing epoxy resin, alkyd resins and polyester resins, said preformed polymer being dissolved in at least one polymerisable ethylenically unsaturated monomer selected from the group consisting of hydroxyethyl methacrylate, butyl methacrylate, ethyl acrylate, butyl acrylate, 2-ethylhexyl acrylate, methyl methacrylate, and
   (b) causing polymerisation of the ethylenically unsaturated monomer and forming disperse particles of film-forming polymer, the particles comprising a blend of preformed polymer and of polymer formed in situ from unsaturated monomer, (c) thereafter adding, to the dispersion of polymer particles formed in (b), further polymerisable ethylenically unsaturated monomer, which, if polymerised alone, would yield polymer of Tg higher than that of the polymer formed in situ in (b), the amount of said added monomer being in the range of from 1 to 50% by weight of the total monomer, and (d) causing polymerisation of this further monomer to produce a dispersion of film-forming polymer particles which are a modification of the particles produced in (b).

2. A process according to claim 1 wherein the stability of the dispersion in (a) is due, at least in part, to cationic stabilising groups present in the preformed polymer or in a monomer to be polymerised in situ.

3. A process according to claim 1, wherein the stability of the dispersion in (a) is due, at least in part, to the presence of a distinct cationic surfactant.

4. A process according to claim 1 wherein a cross-linking agent is also dissolved in the polymerisable ethylenically unsaturated monomer.

5. A process according to claim 4 wherein the preformed polymer and the polymer formed in situ contain hydroxyl groups and the cross-linking agent is reactive with the hydroxyl groups present in the preformed polymer and in the polymer formed in situ.

6. A dispersion of film-forming polymer particles prepared by a process according to claim 1.

* * * * *